United States Patent
Kumar Singh et al.

(10) Patent No.: US 12,333,578 B2
(45) Date of Patent: Jun. 17, 2025

(54) LEVERAGING STRUCTURED DATA TO RANK UNSTRUCTURED DATA

(71) Applicant: International Business Machines Corporation, Armonk, NY (US)

(72) Inventors: Ankit Kumar Singh, Ranchi (IN); Ratul Sarkar, Bangalore (IN); Noor Mohammed Ashrafi, Bangalore (IN); Srinivasan S. Muthuswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 17/092,345

(22) Filed: Nov. 9, 2020

(65) Prior Publication Data

US 2022/0148048 A1    May 12, 2022

(51) Int. Cl.
*G06F 16/383* (2019.01)
*G06F 16/84* (2019.01)
(Continued)

(52) U.S. Cl.
CPC ....... *G06Q 30/0282* (2013.01); *G06F 16/383* (2019.01); *G06F 16/84* (2019.01);
(Continued)

(58) Field of Classification Search
CPC ........ G06F 16/383; G06F 16/84; G06F 40/20; G06F 40/295; G06F 40/30
See application file for complete search history.

(56) References Cited

U.S. PATENT DOCUMENTS 7,249,312 B2    7/2007  Jasper
8,671,040 B2    3/2014  Roser
(Continued)

FOREIGN PATENT DOCUMENTS

CN    109492097 A    3/2019
EP    2138973 A1    12/2009
(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.
(Continued)

*Primary Examiner* — Sanchita Roy
(74) *Attorney, Agent, or Firm* — Yee & Associates, P.C.

(57) ABSTRACT

A system, computer program product, and method are presented for leveraging structured data and unstructured data, and, more specifically, to ranking documentation from unstructured data sources through leveraging insights provided by the structured data to facilitate associated business risk inquiries. The method includes identifying, by researching subject business entities, one or more structured data sources that include relevant structured data directed to the subject business entities. The method also include extracting the relevant structured data directed toward the subject business entities and leveraging the relevant structured data to identify unstructured data sources. The method further includes identifying documents from the unstructured data sources that have relevant information, thereby identifying relevant unstructured data, and leveraging the relevant structured data to determine relationships with the relevant unstructured data. The method also includes scoring each
(Continued)

relationship and ranking each document from the unstructured data sources as a function of the scoring.

16 Claims, 7 Drawing Sheets

(51) Int. Cl.
    *G06F 40/20*     (2020.01)
    *G06F 40/295*     (2020.01)
    *G06F 40/30*     (2020.01)
    *G06Q 30/0282*     (2023.01)

(52) U.S. Cl.
    CPC ............ *G06F 40/20* (2020.01); *G06F 40/295* (2020.01); *G06F 40/30* (2020.01)

(56) References Cited

U.S. PATENT DOCUMENTS

| | | | |
|---|---|---|---|
| 10,013,694 | B1 | 7/2018 | Israeli |
| 10,163,158 | B2 | 12/2018 | Song |
| 10,956,678 | B2 * | 3/2021 | Hadi ........................ G06F 40/30 |
| 2008/0065655 | A1 * | 3/2008 | Chakravarthy ......... G06F 16/38 |
| 2012/0197862 | A1 * | 8/2012 | Woytowitz .............. G06F 16/36 |
| | | | 707/E17.109 |
| 2013/0325881 | A1 * | 12/2013 | Deshpande ........... G06F 16/955 |
| | | | 707/755 |
| 2014/0297356 | A1 * | 10/2014 | Jayade ............. G06Q 10/06316 |
| | | | 705/317 |
| 2015/0154284 | A1 * | 6/2015 | Pfeifer ................ G06F 16/3344 |
| | | | 707/723 |
| 2016/0371618 | A1 * | 12/2016 | Leidner .............. G06Q 10/0635 |
| 2017/0060915 | A1 * | 3/2017 | Bhide ................ G06F 16/24578 |
| 2019/0278777 | A1 * | 9/2019 | Malik ................. G06F 16/9024 |
| 2019/0303395 | A1 * | 10/2019 | Flood .................... G06F 40/295 |
| 2020/0065383 | A1 * | 2/2020 | Hadi ....................... G06N 3/044 |

FOREIGN PATENT DOCUMENTS

| | | |
|---|---|---|
| EP | 21389731 A1 | 12/2009 |
| KR | 101531970 B1 | 6/2015 |
| KR | 101599675 B1 | 3/2016 |
| TW | 409714 A | 7/2011 |

OTHER PUBLICATIONS

Barrish, C., 2 More Former Wilmington Trust Officers Get Prison Time For 'Tangled Web' Of Crimes, Retrieved from: https://whyy.org/articles/2-more-ex-wilm-trust-officers-get-prison-time-for-roles-in-tangled-web-of-crimes/#:~:text=Bailey%20also%20pleaded%20guilty%20to,his%20role%20in%20that%20conspiracy., Jan. 17, 2019, 9 pages.

MyPayrollHR CEO Arrested, Admits to $70M Fraud, Retrieved from: https://krebsonsecurity.com/2019/09/mypayrollhr-ceo-arrested-admits-to-70m-fraud/, Sep. 27, 2019, 5 pages.

* cited by examiner

LEVERAGING STRUCTURED DATA TO RANK UNSTRUCTURED DATA

BACKGROUND

The present disclosure relates to leveraging structured data and unstructured data, and, more specifically, to ranking documentation from unstructured data sources through leveraging insights provided by the structured data to facilitate associated business risk inquiries.

Many known business entities, including banking entities and insurance companies, include one or more known mechanisms for establishing proper identification and verification of potential customers and clients prior to establishing a formal business relationship therebetween. Many of these known mechanisms include researching established structured data sources, where the data is typically highly-organized and formatted to be easily searchable in relational databases, e.g., financial reports from established financial clearinghouses. In some instances, one or more searches are initiated for unstructured data that has no pre-defined format or organization, thereby being much more difficult to collect, process, and analyze. Such unstructured data may include articles and documents from any sources, e.g., electronic copies of newspaper articles and blog posts. Some known methods for locating such unstructured data include manual searches through known search engines, where the data located may, or may not, be fully factual or relevant. In addition, such searches may be limited or truncated due to time and resource constraints.

SUMMARY

A system, computer program product, and method are provided for ranking documentation from unstructured data sources through leveraging insights provided by the structured data to facilitate associated business risk inquiries.

In one aspect, a computer system is provided for ranking documentation from unstructured data sources through leveraging insights provided by the structured data to facilitate associated business risk inquiries. The system includes one or more processing devices and at least one memory device operably coupled to the one or more processing device. The one or more processing devices are configured to identify, through research of one or more subject business entities, one or more structured data sources, wherein the one or more structured data sources include at least a portion of relevant structured data directed to the one or more subject business entities. The one or more processing devices are also configured to extract at least a portion of the relevant structured data directed toward the one or more subject business entities, and leverage the at least a portion of the relevant structured data to identify one or more unstructured data sources. The one or more processing devices are further configured to identify one or more documents from one or more unstructured data sources that have relevant information embedded therein, to thereby identify relevant unstructured data. The one or more processing devices are also configured to leverage the at least a portion of the relevant structured data to determine one or more relationships with at least a portion of the relevant unstructured data. The one or more processing devices are further configured to score each relationship of the one or more relationships, and rank each document of the one or more documents from the one or more unstructured data sources as a function of the score of each relationship of the one or more relationships.

In another aspect, a computer program product is provided for ranking documentation from unstructured data sources through leveraging insights provided by the structured data to facilitate associated business risk inquiries. The computer program product includes one or more computer readable storage media, and program instructions collectively stored on the one or more computer storage media. The product also includes program instructions to identify, through research of one or more subject business entities, one or more structured data sources, wherein the one or more structured data sources include at least a portion of relevant structured data directed to the one or more subject business entities. The computer program product also includes program instructions to extract the at least a portion of the relevant structured data directed toward the one or more subject business entities. The computer program product further includes program instructions to leverage the at least a portion of the relevant structured data to identify one or more unstructured data sources. The computer program product also includes program instructions to identify one or more documents from one or more unstructured data sources that have relevant information embedded therein, to thereby identify relevant unstructured data. The computer program product further includes program instructions to leverage the at least a portion of the relevant structured data to determine one or more relationships with at least a portion of the relevant unstructured data. The computer program product also includes program instructions to score each relationship of the one or more relationships, and program instructions to rank each document of the one or more documents from the one or more unstructured data sources as a function of the score of each relationship of the one or more relationships.

In yet another aspect, a computer-implemented method is provided for ranking documentation from unstructured data sources through leveraging insights provided by the structured data to facilitate associated business risk inquiries. The method includes identifying, by researching one or more subject business entities, one or more structured data sources, wherein the one or more structured data sources include at least a portion of relevant structured data directed to the one or more subject business entities. The method also includes extracting the at least a portion of the relevant structured data directed toward the one or more subject business entities. The method further includes leveraging the at least a portion of the relevant structured data to identify one or more unstructured data sources. The method also includes identifying one or more documents from one or more unstructured data sources that have relevant information embedded therein, thereby identifying relevant unstructured data. The method further includes leveraging the at least a portion of the relevant structured data to determine one or more relationships with at least a portion of the relevant unstructured data. The method also includes scoring each relationship of the one or more relationships, and ranking each document of the one or more documents from the one or more unstructured data sources as a function of the scoring of each relationship of the one or more relationships.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
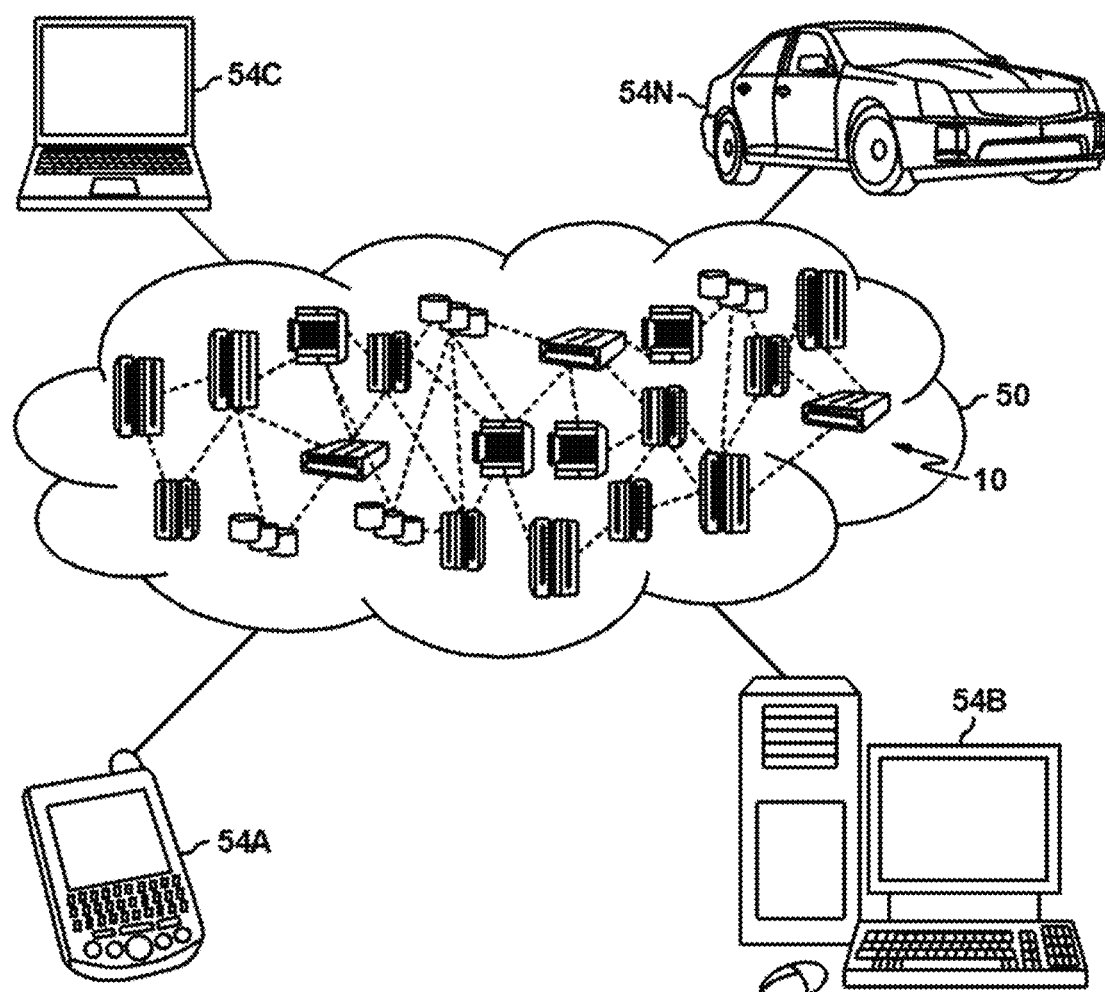
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
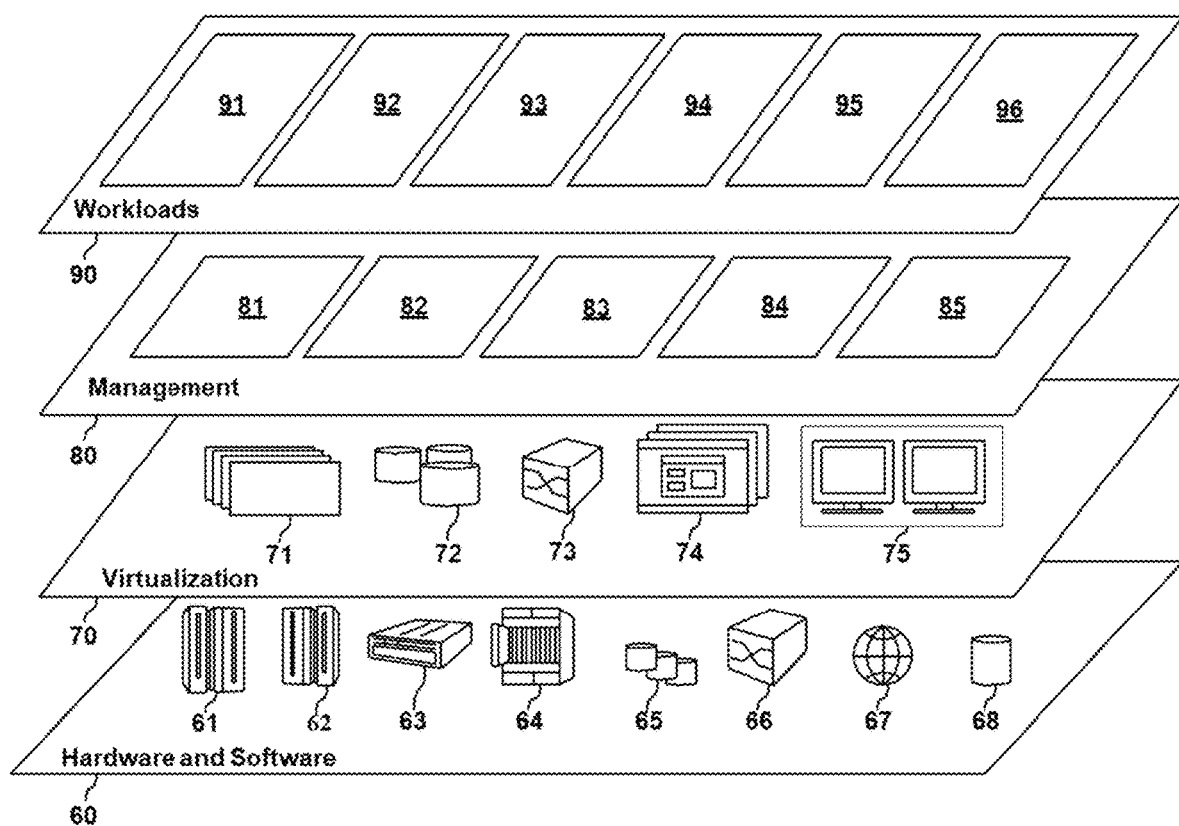
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ranking documentation from unstructured data sources to facilitate extended customer identification and verification 96.

Figure 3:
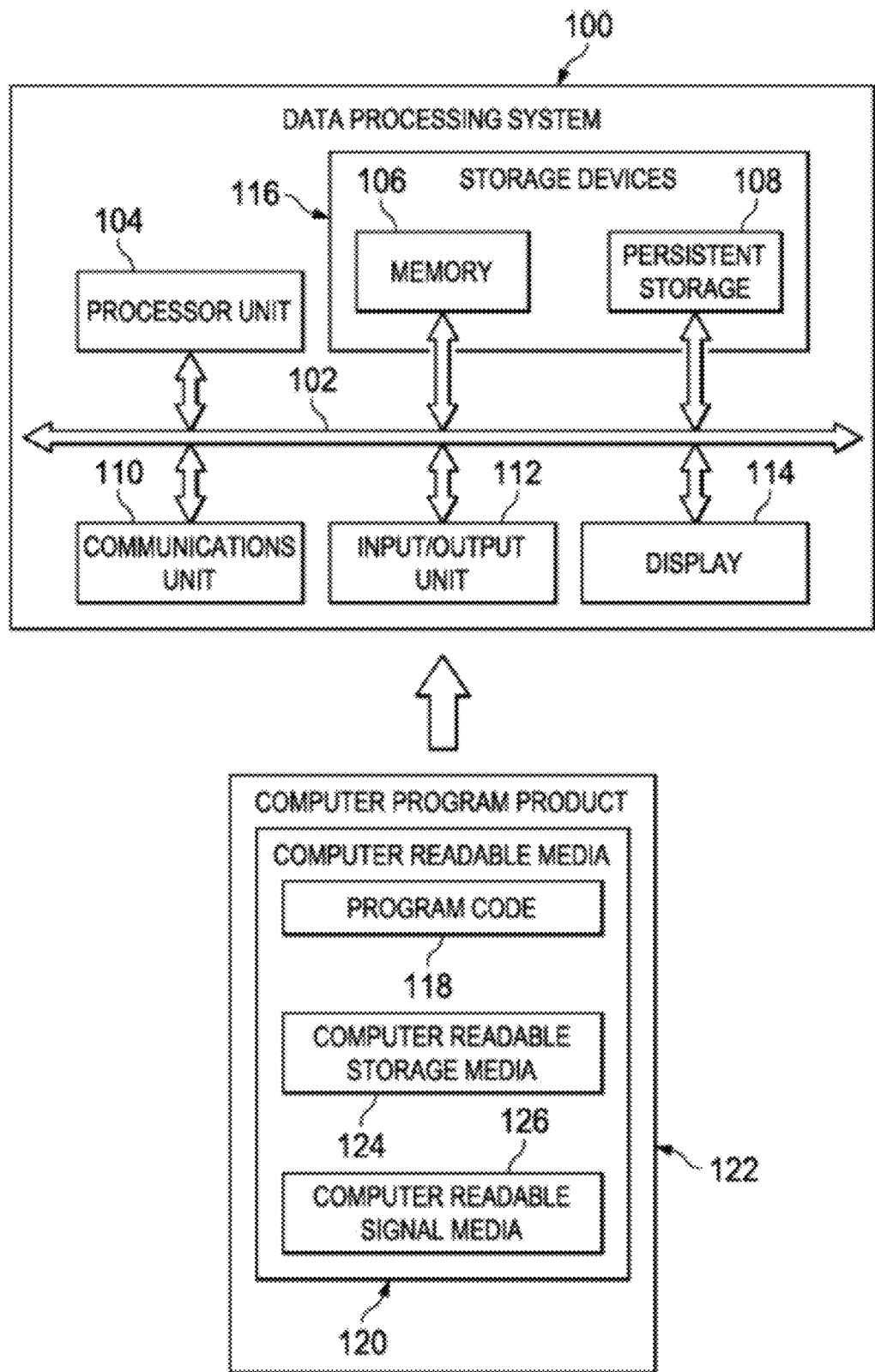
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known financial business entities, including banking entities and insurance companies, include one or more known mechanisms for establishing proper identification and verification of potential customers and clients prior to establishing a formal business relationship therebetween. Therefore, such financial business entities are referred to herein as researching business entities. Such potential customers and clients may include other business entities, for example, established corporations, shell companies, and independent entrepreneurs, and such researching includes identifying and mitigating potential risks of forming such relationships with the researched subject business entities. At least some of these activities use techniques that include "know-your-customer" (KYC) risk assessments. Regardless of the designation, many of these known mechanisms include researching established structured data sources, where the data is typically highly-organized and formatted to be easily searchable in relational databases, e.g., financial reports from established financial clearinghouse and annual reports (for those researched subject business entities that are publicly traded). However, such structured data may not include all of the data relevant for determining a business risk associated with engagement. For example, in some instances, questionable activities by current and former employees and principals of a researched subject business entity under consideration may not be present in the structured data. Similar research may also be performed with respect to existing client and customers.

At least some of these known mechanisms also include one or more searches that are initiated for unstructured data that has no pre-defined format or organization, thereby being much more difficult to collect, process, and analyze. Such unstructured data may include documents from any source, e.g., without limitation, newspaper and trade publication articles, on-line news releases, law enforcement data, and blog posts. Some known methods for locating such unstructured data include manual searches through known search engines, where the data located may, or may not, be fully factual or relevant. In addition, such searches may be limited or truncated due to time and resource constraints. Also, in at least some instances, the mechanisms employed to search for the relevant unstructured sources may simply fail to uncover all relevant documents, since any context of the information found in relation to purported negative data that may lead to further inquiry may remain hidden.

Furthermore, some known methods include scoring and ranking the individual pieces of unstructured data. The scoring and ranking is typically performed such that the more negative data receives higher scoring than less negative data, thereby reflecting higher and lower risk, respectfully. However, in many cases, relationships between the structured data and unstructured data, as well as between the various pieces of unstructured data, are not uncovered and the subsequent ranking of the unstructured data may be erroneous, typically leaning toward the information receiving a less negative score indicating a lesser risk than is actually present. In addition, isolated information in a few unstructured data sources that may lead to further relevant correlations given further inquiry or the proper context may be overlooked. Accordingly, an inflated positive risk assessment may lead to unfortunate actions on the part of the researching business entity, e.g., and without limitation, inflating a credit limit or deflating an interest rate without knowledge that may otherwise lead to different conclusions with respect to the actual risk, thereby increasing the risk of negative impact on the researching business entity.

A system, computer program product, and method are disclosed and described herein directed toward leveraging structured data and unstructured data, and, more specifically, to ranking documentation from unstructured data sources through leveraging insights provided by the structured data to facilitate associated business risk inquiries. Initially, a search is conducted for the researched subject business entity from the structured sources to gain important, useful, and relevant information such as, without limitation, management role, location, associations, any politically exposed persons (PEP), and past or pending disciplinary sanctions data. Using the information gained from structured sources, a further search is conducted from one or more unstructured sources (e.g., articles) and additional extracted data and metadata information is obtained from the unstructured sources. The data captured from the unstructured sources, e.g., each of the articles, is provided with an initial scoring, and therefore an initial ranking. In general, the researching business entity is most concerned with "negative news" regarding the subject business entity being researched. The captured unstructured source data is examined as part of a due diligence process within the KYC process that looks for evidence indicative of financial risk including, without limitation, fraud, money laundering, business practices and activities not associated with the advertised core businesses, and stated physical addresses that appear to be inconsistent with the actual locations and occupants thereof. The scorings of the articles captured from the unstructured sources are re-evaluated, i.e., the captured unstructured data is reranked based on the new insights gleaned, i.e., extracted from the due diligence process using the structured data. Accordingly, the new ranking of the documentation from the unstructured data sources is facilitated through leveraging insights provided by the structured data to analyze the unstructured data, thereby facilitating further examination of the subject business clients and possible discovery of otherwise hidden business risks.

In one or more embodiments, data from one or more structured sources directed toward the subject business entity is ingested. Data of interest that may provide relevant insight includes the names of the principals, past and present, of the subject business entity including, for example, and without limitation, the chief executive officer (CEO), board of directors, president, chief financial officer (CFO), treasurer, and similar information of those individuals associated with the management of the subject business entity. Also, data of interest that may provide relevant insight includes, without limitation, each of the aforementioned individuals' associations and roles within the business entity, including with each other, the physical locations of the business offices, published financial data, including previous or pending legal or financial sanctions, and politically exposed persons (PEPs). As used herein, a PEP is one who has been entrusted with a prominent public function and may therefore generally present a higher risk for potential involvement in acts including, and without limitation, bribery and corruption by virtue of their position and the influence that they may hold. Accordingly, in at least some embodiments, the data collected from the structured sources may include information that by itself poses neither a positive nor negative influence on the respective scoring; however, such information may be useful in locating relevant unstructured data that may impact the scoring.

In some embodiments, the information captured from the structured data is used to conduct additional searching through one or more unstructured sources thereon. For example, and without limitation, a search engine's search syntax may be updated with a portion of such information, e.g., the CEO and the CFO and the resultant collected documents from the unstructured sources will be further analyzed, i.e., further scrutinized through natural language processing (NLP) processes and stored. As used herein, the unstructured data sources are not limited to corporate news sources. Rather, the unstructured sources may be any sources to capture any information that is publicly available, whether free or subject to fees.

In embodiments, the collected documents may be assigned a preliminary ranking based on the initial analysis. More specifically, the documents collected from the unstructured sources are processed such that the subject of the document is identified and the subject may be resolved through the structured data as a function of the attributes of both the unstructured data and the structured data. Such attributes include the data and the metadata of the unstructured documents, and may include, without limitation, features of the respective subject business entities and individuals associated therewith. In at least some embodiments, data such as, and without limitation, the business entities, associated individuals, and locations are analyzed to establish one or more relationships to at least preliminarily establish a relationship between the structured and unstructured data. Therefore, the information, mostly extracted from the structured sources, is leveraged to complement the additional data associated with the subject business entities, associated individuals, and locations to form a better context of the respective relationships therebetween. The strength of the contextual relationships therebetween facilitates determining the scoring of such relationships to determine whether the unstructured data is relevant or not. For example, information on the present CFO's address may indicate a recent residential move to a location not proximate any of the known physical office locations, e.g., a significantly more luxurious locale. Similarly, such unstructured sources may indicate that a previous CFO had spent time in a federal penitentiary for mail fraud. Such information will typically not be found in the structured data, but may provide further insight upon further analysis once it is flagged as potentially relevant and scored appropriately. Accordingly, capture of negative information may lead to further targeted searching.

In at least some embodiments, as the data, including credentials of the principals and the business entity, are mapped between the structured and unstructured data as previously described, the unstructured data is further analyzed to generate the new, updated ranking on the respective unstructured data document. The names, relationships, addresses, etc., are cross-correlated in the analyses of the unstructured data in light of the structured data. For example, and without limitation, returning to the example of a former CFO that had served time for a crime, the unstructured data may indicate a change in CFOs and the selling of a related residence proximate the respective time frame of incarceration, and a new address upon release from such incarceration. In addition, as each portion of additional unstructured data is collected, analyzed, and sentimentally associated with the previous respective unstructured data as well as the respective structure data, the unstructured data scoring for each respective piece of unstructured data is iteratively adjusted, upward for a negative sentiment polarity (i.e., unfavorable information) or downward for a positive sentiment polarity (i.e., favorable information), thereby iteratively improving the classification, i.e., scoring of the subject information. Moreover, at least a portion of the structured and unstructured data is co-referenced through the collected metadata of the words and phrases used in the structured and unstructured data to match words and phrases that are not always obviously related. Such co-referencing of the structured and unstructured data facilitates exploring a potential syntactic relationship that exists between coreferential expressions in the text of the unstructured data.

In one or more embodiments, as the unstructured data is scored, the unstructured data documents are also ranked to facilitate easy identification of the highest ranked negative data. Accordingly, executing sentiment analysis and co-referencing of the structured and unstructured data provides for scoring and ranking of the unstructured data documents with respect to the risk of establishing a business relationship with the respective subject business entity.

Figure 4:
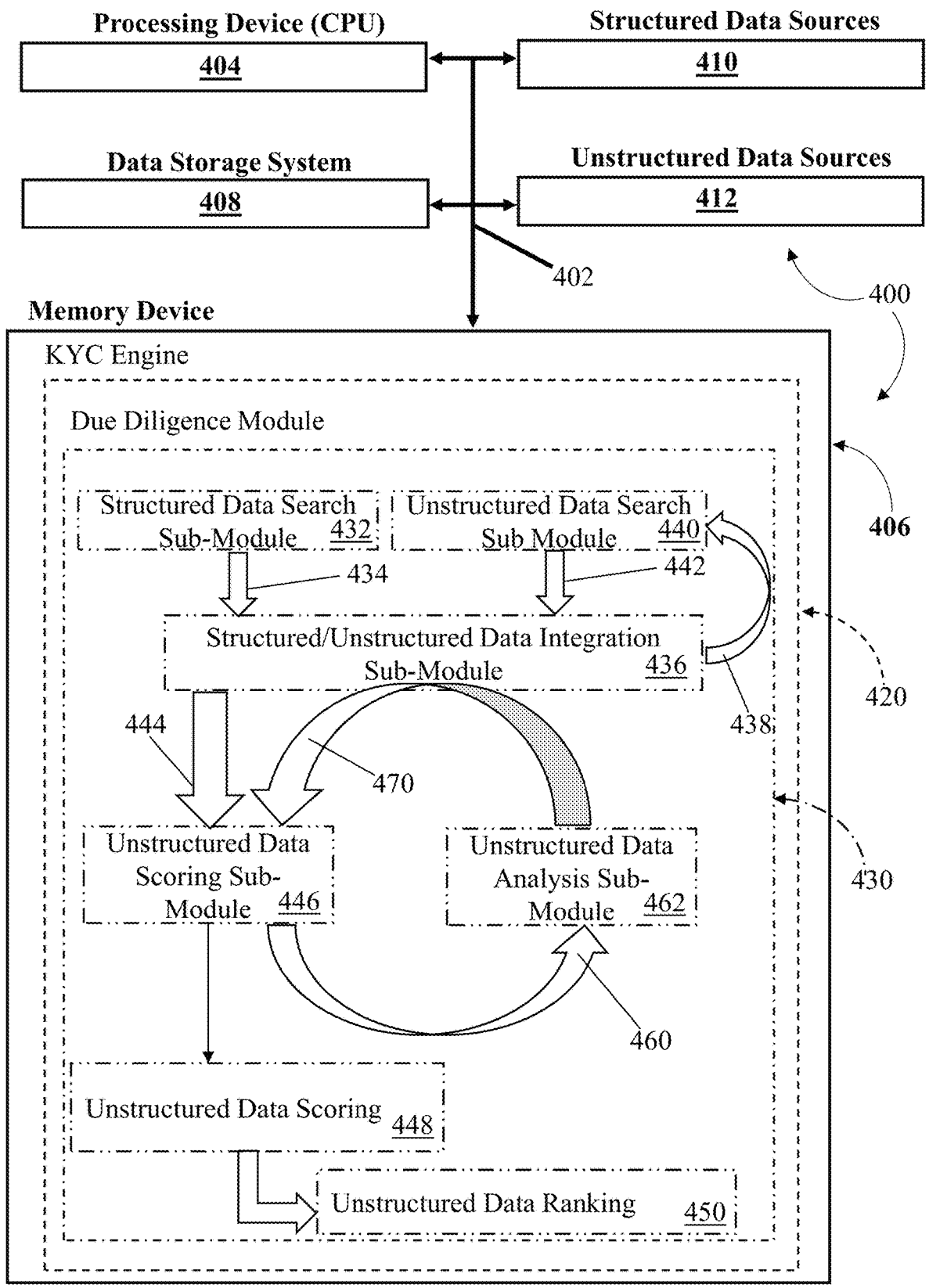
FIG. 4 is a schematic diagram illustrating a system configured to rank documentation from unstructured data sources through leveraging insights provided by structured data, in accordance with some embodiments of the present disclosure.

Referring to FIG. 4, a schematic diagram is presented illustrating a system, i.e., an unstructured data ranking system 400 configured to rank documentation from unstructured data sources through leveraging insights provided by structured data. The unstructured data ranking system 400 includes one or more processing devices 404 (only one shown) communicatively and operably coupled to one or more memory devices 406 (only one shown). The unstructured data ranking system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively. The memory device 406 and the data storage system 408 are communicatively coupled to one or more structured data sources 410 and one or more unstructured data sources 412 through, in some embodiments, the input/output unit 112 (shown in FIG. 1).

In at least some embodiments, the memory device 406 includes a know-your-customer or know-your-client (KYC) engine 420 that includes a due diligence module 430 embedded therein. The KYC engine 420 is configured to execute the due diligence aspects of the KYC statutes and guidelines through the due diligence module 430. The due diligence module 430 includes a plurality of sub-modules that are discussed further herein. The KYC statues and guidelines are applicable to business entities in the financial services industry and are also used in other non-financial sectors as well. In general, the KYC guidelines in the financial services sector requires that professionals try to verify the identity, suitability, and risks involved with maintaining a business relationship. In at least some aspects, the KYC processes are employed by business entities for the purpose of ensuring their prospective customers, clients, agents, consultants, or distributors are actually who they claim to be and are not involved in any illegal financial transactions, e.g., and without limitation, money laundering, bribery, and extortion by demanding such new entities provide detailed due diligence information with respect to their organizations and their financial dealings.

Therefore, many known financial business entities, including banking entities and insurance companies, include one or more known mechanisms for establishing proper identification and verification of potential customers, clients, etc., prior to establishing a formal business relationship therebetween. Such financial business entities are referred to herein as researching business entities. Such potential customers, clients, etc., may include other business entities, for example, established corporations, shell companies, and independent entrepreneurs, and such researching includes identifying and mitigating potential risks of forming such relationships with the researched subject business entities through the due diligence aspects of the KYC guidelines.

Figure 5A:
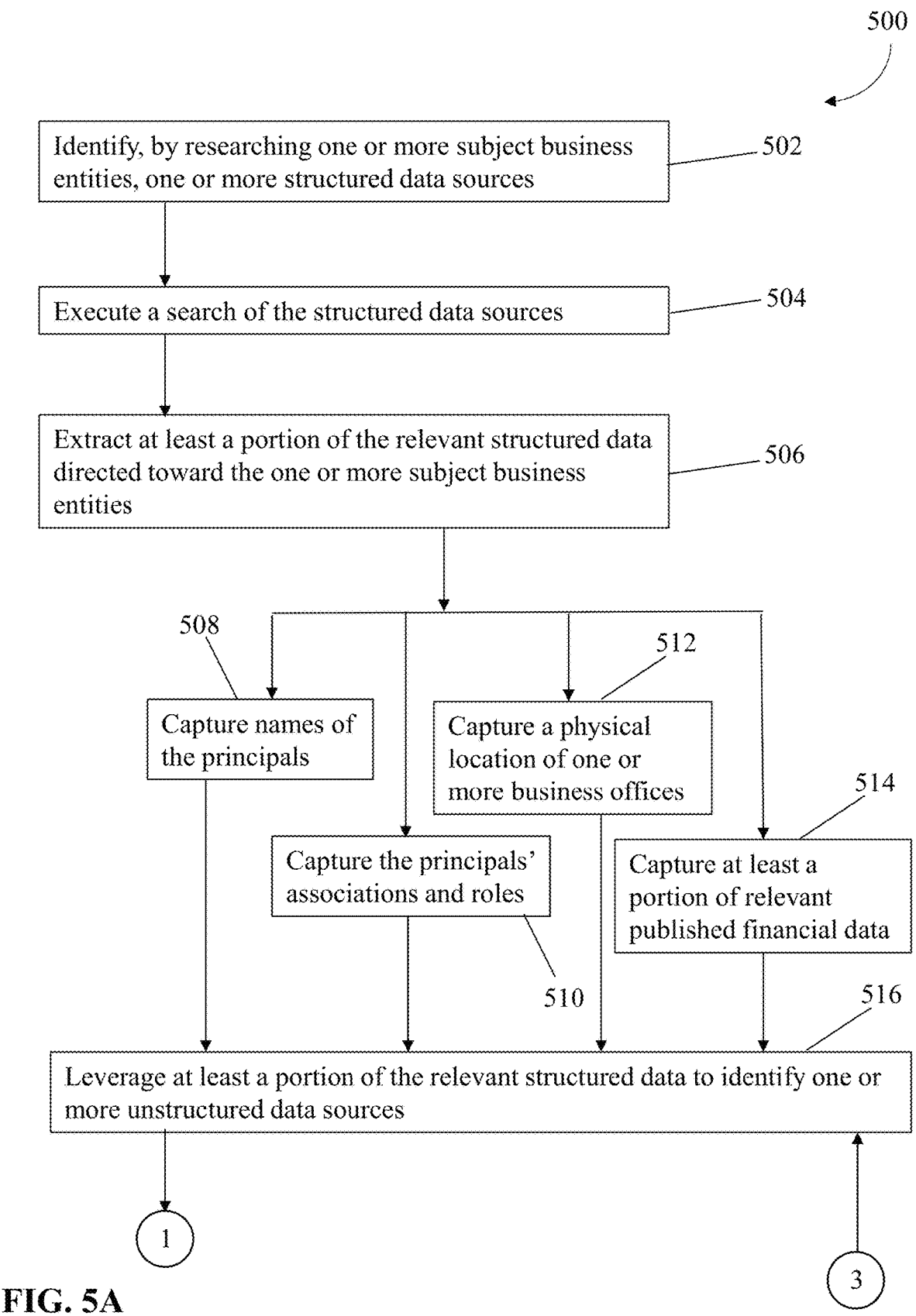
FIG. 5A is a flowchart illustrating a process for ranking documentation from unstructured data sources through leveraging insights provided by the structured data, in accordance with some embodiments of the present disclosure.
Figure 5B:
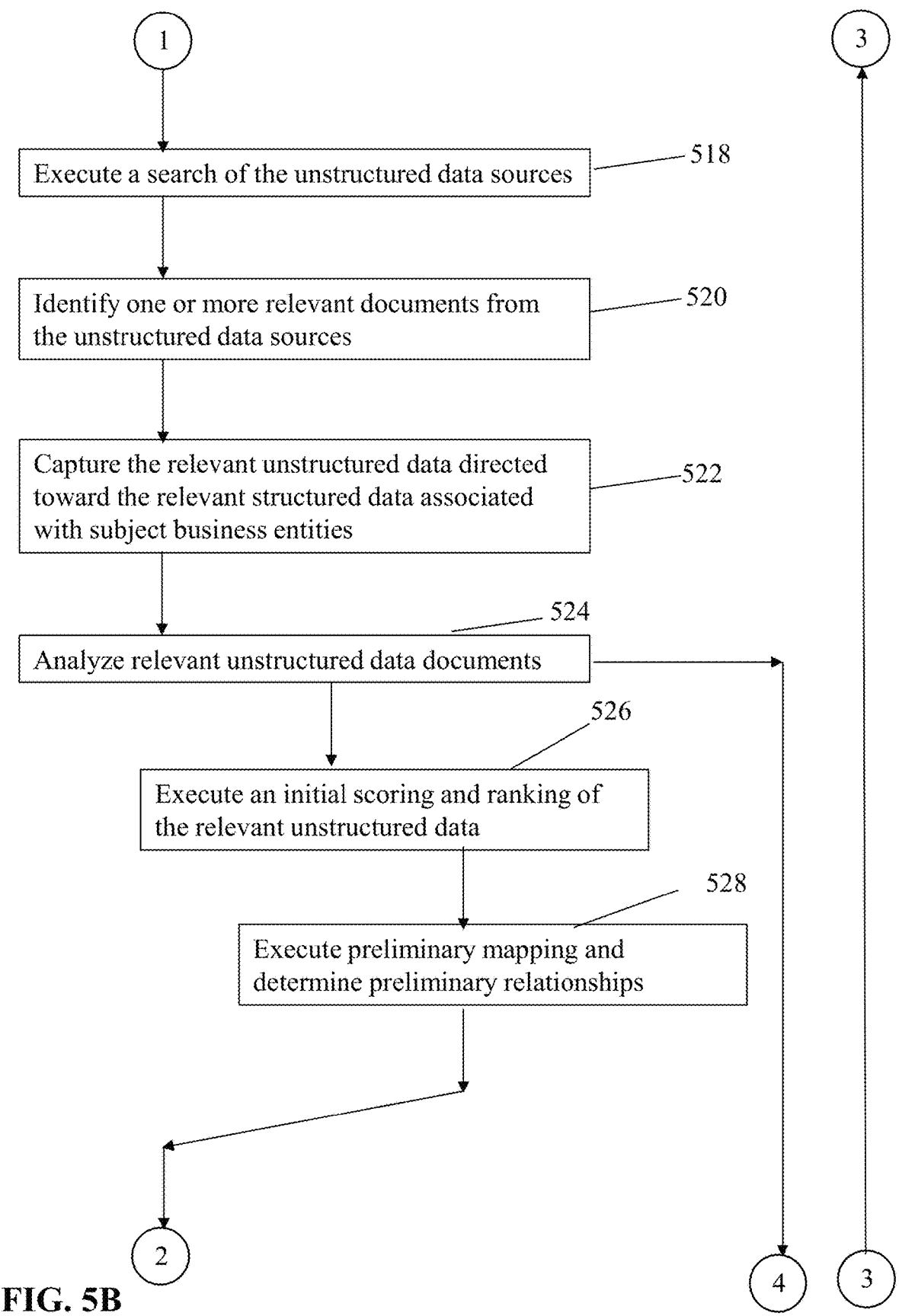
FIG. 5B is a continuation of the flowchart in FIG. 5A illustrating a process for ranking documentation from unstructured data sources through leveraging insights provided by the structured data, in accordance with some embodiments of the present disclosure.
Figure 5C:
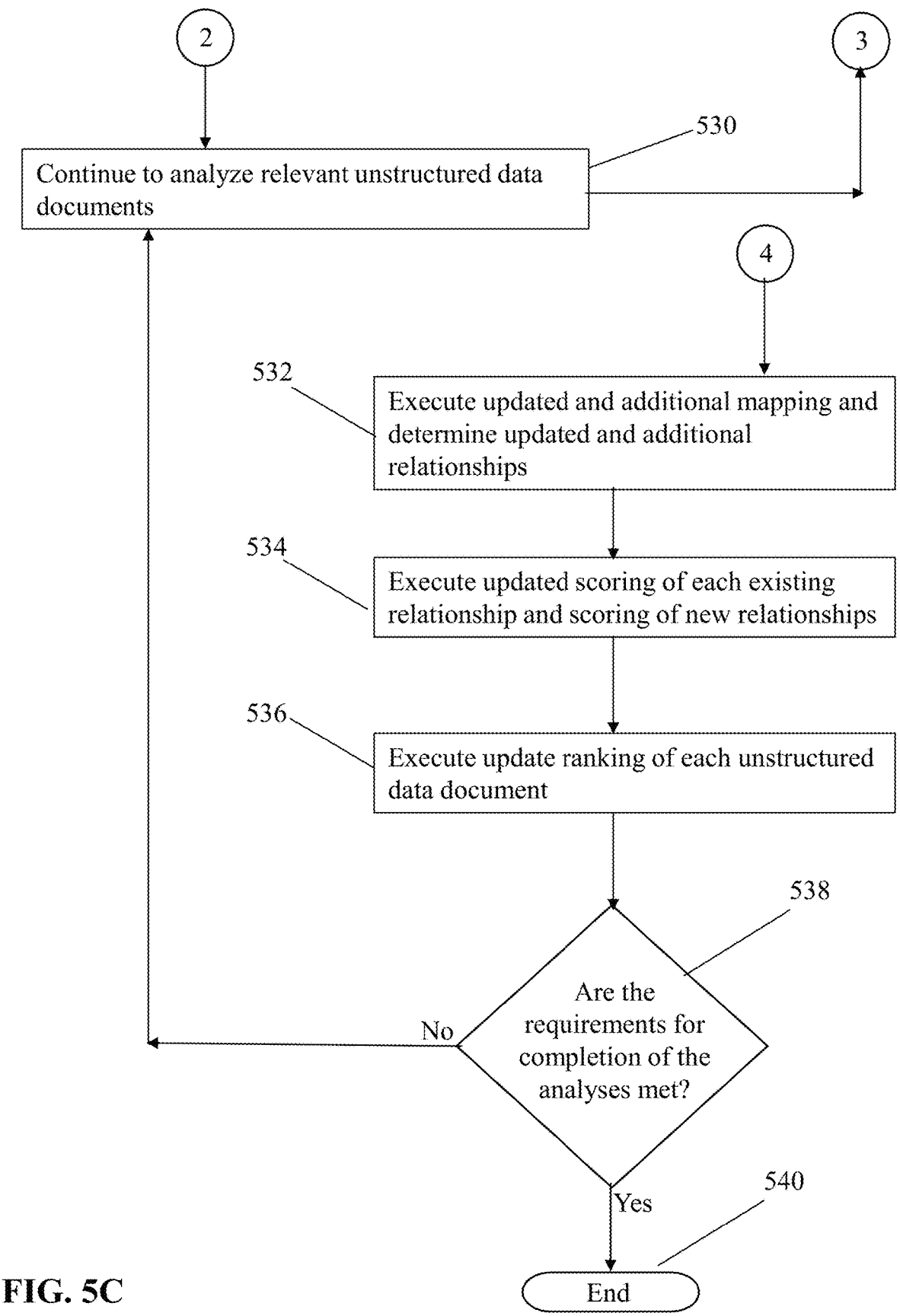
FIG. 5C is a continuation of the flowchart in FIGS. 5A and 5B illustrating a process for ranking documentation from unstructured data sources through leveraging insights provided by the structured data, in accordance with some embodiments of the present disclosure.

Also referring to FIG. 5, in conjunction with FIG. 4, a flowchart is provided illustrating a process 500 for ranking documentation from unstructured data sources through leveraging insights provided by the structured data. In one or more embodiments, for each prospective business client, etc., i.e., for each subject business entity, a structured data search sub-module 432 is used to identify 502 one or more relevant structured data sources 410. The structured data search sub-module 432 is embedded within the due diligence module 430. In some embodiments, general search engines may be used to search the Internet for relevant data associated with the subject business entities to locate the relevant structured data sources 410, as well as all of the searches as described herein. In some embodiments, proprietary search engines designed to specifically conduct such searches as described herein are used. In some embodiments, the searches are executed with human assistance. In some embodiments, the searches described herein are conducted with near-full, or full automation once the target business entities are identified. Therefore, regardless of the exact methods, the search engines, the level of automation, and the nature of the target business entities, identifying 502 and researching established structured data sources 410 is conducted.

The structured data sources 410 are typically configured such that the data stored therein is highly-organized and formatted to be easily searchable in relational databases. In general, the structured data search is conducted for the researched subject business entity from the structured sources to gain important, useful, and relevant information. In some embodiments, a single structured data source 410 will provide the necessary, relevant structured data 434 for the analyses described herein. In some embodiments, a single structured data source 410 will include only a portion of the relevant structured data 434 directed to the one or more subject business entities and a plurality of structured data sources 410 will be queried, i.e., searched 504 by the structured data search sub-module 432 as a function of the identification operations 502. For those documents including relevant structured data 434, the documents including at least a portion of the relevant structured data 434 directed toward the one or more subject business entities is extracted 506 and stored in the data storage system 408. Accordingly, the relevant structured data sources 410 are identified 502 and queried, and the relevant structured data 434 is extracted 506 and collected and stored within the data storage system 408.

Data of interest that may provide relevant insight into the subject business entity includes the names of the principals, past and present, of the subject business entity including, for example, and without limitation, the chief executive officer (CEO), board of directors, president, chief financial officer (CFO), treasurer, and similar information of those individuals associated with the management of the subject business entity. Therefore, the extracting operation 506 includes capturing 508 names of the principals, past and present, of the one or more subject business entities. Also, data of interest that may provide relevant insight includes, without limitation, each of the aforementioned individuals' associations and roles within the business entity, including with each other. Therefore, the extracting operation 506 includes capturing 510 one or more of the principals', past and present, associations and roles within the one or more subject business entities. Information on the principals also includes, without limitation, previous or pending legal, disciplinary, or financial sanctions, and politically exposed persons (PEPs). As used herein, a PEP is one who has been entrusted with a prominent public function and may therefore generally present a higher risk for potential involvement in acts including, and without limitation, bribery and corruption by virtue of their position and the influence that they may hold. In addition, the extracting operation 506 includes capturing 512 a physical location of one or more business offices associated with the one or more subject business entities. Furthermore, the extracting operation 506 includes capturing 514 at least a portion of relevant published financial data associated with the one or more subject business entities. Such financial data includes, without limitation, financial reports from established financial clearinghouses and annual reports from websites operated by the subject business entities for those researched subject business entities that are publicly traded. Accordingly, the extracting 506 and capturing 508 through 514 of the structured data documents 442 data are not limited to the aforementioned examples, and any data that enables operation of the unstructured data ranking system 400 as described herein.

However, in some embodiments, such structured data 434 may not include all of the data relevant for determining a business risk associated with engagement between the researching business entity and the subject business entity. For example, in some instances, and without limitation, questionable activities by current and former employees and principals of the researched subject business entity under consideration, e.g., those activities that the KYC process is configured to identify as described above, may not be present in the structured data 434. In at least some embodiments, the structured data 434 collected from the structured data sources 410 may include information that by itself poses neither a positive nor negative influence on the respective scoring (discussed further herein); however, such information may be useful in locating relevant unstructured data that may impact the scoring. Therefore, the due diligence module 430 includes a structured/unstructured data integration sub-module 436 that facilitates a plurality of functions, including leveraging 516 at least a portion of the relevant structured data to identify one or more unstructured data sources 412.

In at least one embodiment, the information captured from the structured data 434 is used to conduct additional searching through one or more unstructured data sources 412. For example, and without limitation, a search engine's search syntax may be updated with a portion of such information by the structured/unstructured data integration sub-module 436. Therefore, at least a portion of the captured structured data 434 is transmitted to an unstructured data search sub-module 440 that is resident within the due diligence module 430 in the form of updated search terms 438 based on the captured structured data 434. Accordingly, a plurality of unstructured data sources 412 will be queried, i.e., searched 518 by the unstructured data search sub-module 440 as a function of the identification operations associated with the leveraging operation 516.

In one or more embodiments, one or more relevant documents from the unstructured data sources 412 are identified 520 and the relevant unstructured data documents 442 directed toward the relevant structured data 434 associated with the subject business entities is captured 522. The terms relevant unstructured data documents 442 and relevant unstructured data are used interchangeably herein. Therefore, additional extracted data and metadata information is obtained from the unstructured sources 412. As used herein, the unstructured data sources 412 are not limited to corporate news sources. Rather, the unstructured data sources 412 may be any sources to capture any information that is publicly available, whether free or subject to fees. Such unstructured data documents 442 may include documents from any sources, e.g., without limitation, newspaper and trade publication articles, on-line news releases, law enforcement data, and blog posts. Accordingly, the relevant unstructured data documents 442 are identified 520 and captured 522 as a function of the captured structured data 434.

The structured/unstructured data integration sub-module 436 receives the relevant unstructured data documents 442 from the unstructured data sources 412, where the resultant collected relevant unstructured data documents 442 will be further analyzed 524 through, for example, and without limitation, natural language processing (NLP) features and stored in the data storage system 408. The captured relevant unstructured data documents 442 will be examined as part of the due diligence process within the KYC process that looks for evidence indicative of financial risk to the researching business entity including, without limitation, fraud, money laundering, business practices and activities not associated with the advertised core businesses, and stated physical addresses that appear to be inconsistent with the actual locations and occupants thereof. Upon ingestion into the unstructured data ranking system 400, in at least some embodiments, the relevant unstructured data documents 442 are at least partially integrated with the structured data 434 within the structured/unstructured data integration sub-module 436 in order to execute an initial scoring and ranking operation 526 of the unstructured data documents 442.

More specifically, in some embodiments, a preliminary, or first mapping of the unstructured data documents 442 and the structured data 434 is executed 528 by the structured/unstructured data integration sub-module 436 to determine one or more preliminary, or first relationships therebetween. The names, relationships, addresses, etc., are cross-correlated in the analyses of the unstructured data documents 442 in light of the structured data 434. The collected relevant unstructured data documents 442 will be assigned the preliminary scoring and ranking based on an initial analysis of the mapped relationships, where the mapping of the relationships is contextually-based. More specifically, the unstructured data documents 442 are processed such that the subject of each respective document is identified and the respective subject may be resolved through the structured data 434 as a function of the attributes of both the unstructured data documents 442 and the structured data 434. Such attributes include the data and the metadata of the unstructured data documents 442, and may include, without limitation, features of the respective subject business entities and individuals associated therewith. Therefore, in at least some embodiments, data such as, and without limitation, the subject business entities, associated individuals, and locations are analyzed to at least preliminarily establish the one or more contextually-based relationships between the structured data 434 and the unstructured data documents 442.

As such, information that is mostly extracted from the structured data 434 is leveraged to complement the additional data in the unstructured data documents 442 that is associated with the subject business entities, associated individuals, and locations to form a better context of the respective relationships therebetween. The strength of the contextual relationships therebetween facilitates determining the scoring of such relationships to determine whether the unstructured data in the unstructured data documents 442 is relevant or not. For example, information on the present CFO's address may indicate a recent residential move to a location not proximate any of the known physical office locations, e.g., a significantly more luxurious locale. Similarly, such unstructured data documents 442 may indicate that a previous CFO had spent time in a federal penitentiary for mail fraud. Such information will typically not be found in the structured data 434, but may provide further insight upon further analysis once it is flagged as potentially relevant and scored appropriately. Accordingly, data is associated between the unstructured data documents 442 and the structured data 434 through mapping and determining relationships therebetween.

In some embodiments, and without limitation, data associated with the mapping and determined relationships, i.e., mapping/relationship data 444 between the unstructured data documents 442 and the structured data 434, as well as other data relevant to the scoring of the unstructured data documents 442 is transmitted to an unstructured data scoring sub-module 446. An initial score is assigned to each of the unstructured data documents 442 by the unstructured data scoring sub-module 446 as a function of the strength of the contextual relationships with the structured data 434 as initially determined. The scoring and ranking is typically performed such that the more negative data receives higher scoring than less negative data, thereby reflecting higher and lower risk, respectfully. The unstructured data scoring 448 is converted to an unstructured data ranking 450 as a function of the scoring 448. Accordingly, at least a portion of the relevant structured data 434 is leveraged to determine one or more relationships with at least a portion of the relevant unstructured data documents 442, where such leveraging includes determining one or more relationships with at least a portion of the relevant unstructured data documents 442 through mapping at least a portion of the relevant unstructured data documents 442 to the relevant structured data 434, thereby resulting in a preliminary scoring and ranking of the unstructured data documents 442.

As an example, a first portion of the unstructured data documents 442 can include an article captured 522 as described herein. The subject of interest, i.e., the subject business entity that is undergoing the KYC process is an individual, who is a former employee of another business entity ACME. The business entity ACME is not the subject of the KYC process. For the present, the researching business entity has discovered that the individual undergoing the KYC process is an admitted former employee of the ACME business entity; however, she has not yet provided her previous relationship information with ACME. The principal name capture operation 508 and the principal role capture operation 510 of ACME's structured data does not identify any of the individual's relationships with ACME, a situation that is not unusual in that some organizations may "scrub" their structured data of potentially embarrassing information. Notably, the article located and ingested per operations 516 through 522, includes the name of the ACME business entity, but does not include the name of the former CEO. Therefore, thus far, the scoring of the article per the scoring operation 526 will be a relatively low number, e.g., less than 10 on a scale of 0 to 100, where such scaling is a measure of the risk, i.e., "0" is indicative of no risk and "100" is indicative of great risk. Such scaling is non-limiting and any scoring methods that enable operation of the unstructured data ranking system 400. The scoring other than 0 thus far is substantially based on the name ACME and the CEO identified in the article.

Referring again to FIGS. 4 and 5, in at least some embodiments, as the data, including, without limitation, credentials of the principals and the business entity, are mapped between the structured data 434 and unstructured data documents 442 as previously described, the unstructured data documents 442 are further analyzed 530 to generate new, updated scoring and ranking of the respective unstructured data document 442. Data 460 that includes, without limitation, the at least partially analyzed unstructured data documents 442, at least a portion of the relevant structured data 434, the established mapped relationships therebetween, and the present unstructured data scoring 446 are transmitted to an unstructured data analysis sub-module 462. Accordingly, the names, relationships, addresses, etc., continue to be cross-correlated in the continuing analyses of the unstructured data documents 442 in light of the structured data 434.

The unstructured data analysis sub-module 462 receives the data 460, where the unstructured data documents 442 will be further analyzed 530. As such, the process 500 returns to the leverage structured data operation 516 and executes operations 516 through 524. Specifically, in some embodiments, the unstructured data analysis sub-module 462 includes, for example, and without limitation, NLP features similar to those described herein for the structured/unstructured data integration sub-module 436. In some embodiments, the NLP features of the structured/unstructured data integration sub-module 436 are used. For example, and without limitation, the unstructured data analysis sub-module 462 includes analysis features such as, and without limitation, sentiment analysis and co-referencing features that rely on the NLP features, as described further herein. Output data 470 is transmitted to the unstructured data scoring sub-module 446 from the unstructured data analysis sub-module 462 through the structured/unstructured data integration sub-module 436. The structured/unstructured data integration sub-module 436 determines additional mapping for identifying additional relationships, or to strengthen existing relationships. The structured/unstructured data integration sub-module 436 also generates queries for further searching of the unstructured data sources 412 for additional relevant unstructured data documents 442 through the unstructured data search sub-module 442.

The analyses continue as part of the due diligence process within the KYC process that looks for evidence indicative of financial risk to the researching business entity. In some embodiments, capture of negative information may lead to further targeted searching. The additional unstructured data documents 442 facilitate leveraging additional insights provided by the structured data 434 to analyze the unstructured data documents 442, thereby facilitating further examination of the subject business entities and possible discovery of otherwise hidden business risks. As the iterative process proceeds from operation 530 through 524 as shown in FIG. 5, the structured/unstructured data integration sub-module 436 receives additional relevant unstructured data documents 442 from the unstructured data sources 412, where the resultant collected relevant unstructured data documents 442 will be further analyzed 524 as described herein. As the iterative data flow through the unstructured data analysis sub-module 462, structured/unstructured data integration sub-module 436, and the unstructured data scoring sub-module 446 is executed, the unstructured data scoring 448 and unstructured data ranking 450 are continued to be updated based on the documentation from the unstructured data sources 412. More specifically, updates of the mapping between the existing unstructured data documents 442 and the structured data 434, newly ingested unstructured data documents 442 and the structured data 434, and existing and new relationships are executed 532. As the execution operation 532 is performed, new insights with respect to the one or more contextually-based relationships through each of the relevant unstructured data documents 442 and the structured data 434 is extracted. In addition, updated scoring of each existing relationship and scoring of new relationships is executed 534. Re-evaluating, iteratively, the score of each relevant unstructured data document 442 through the extracted new insights, where the scores are representative of the strength of the one or more contextually-based relationships. Furthermore, updated ranking, i.e., reranking operations 536 of each unstructured data document 442 is executed as a function of the re-evaluated scoring.

In one or more embodiments, and as previously described, executing contextual mapping and relationship determination operation 532 and executing scoring of the relationships operation 534 is at least partially based on analyzing the unstructured data documents 442 through one or more NLP processes. The NLP analyses include a sentiment analysis of at least a portion of the unstructured data documents 442, thereby determining one or more sentimental associations between at least a portion of the unstructured data documents 442 and at least a portion of the structured data 434. Executing the sentiment analysis includes re-evaluating, iteratively, the score of each relevant unstructured data document 442 including adjusting the score of each unstructured data document 442 upward for a negative sentiment polarity, thereby indicating unfavorable information embedded therein. Similarly, executing the sentiment analysis includes re-evaluating, iteratively, the score of each relevant unstructured data document 442 including adjusting the score of each unstructured data document 442 downward for a positive sentiment polarity, thereby indicating favorable information embedded therein. Accordingly, a sentiment analysis is used to adjust the scoring and ranking of at least a portion of the unstructured data documents 442 as a function of positive and negative sentiments.

In at least some embodiments, at least a portion of the structured data 434 and unstructured data documents 442 is co-referenced through the collected metadata of the words and phrases used in the structured data 434 and unstructured data documents 442 to match words and phrases that are not always obviously related. Such co-referencing of the structured data 434 and unstructured data documents 442 facilitates exploring a potential syntactic relationship that exists between co-referential expressions in the text of the unstructured data documents 442. Moreover, the co-referencing features described herein are also configured to analyze the structured data 434 and unstructured data documents 442 to eliminate terms that cannot be co-referenced, either absolutely or usefully. Executing the co-referencing analysis includes re-evaluating, iteratively, the score of each relevant unstructured data document 442 including adjusting the score of each unstructured data document 442 upward for a greater number of syntactic matches, thereby indicating more unfavorable information embedded therein. Similarly, executing the co-referencing analysis includes re-evaluating, iteratively, the score of each relevant unstructured data document 442 including adjusting the score of each unstructured data document 442 downward for a lesser number of syntactic matches, thereby indicating more favorable information embedded therein. Accordingly, a co-referencing analysis is used to adjust the scoring and ranking of at least a portion of the unstructured data documents 442 as a function of discovered syntactic relationships.

Referring again to FIG. 5, the first portion of the unstructured data documents 442, including the first article, is enhanced through identifying a second portion of the unstructured data documents 442, including a second article. The second article is captured 522 as described herein. The subject of interest, i.e., the subject business entity individual, is identified by name in the second article. Contextual mapping and relationship determination operations 532 are executed to determine one or more contextual relationships between the structured data 434 previously discussed and the two articles. For example, a plurality of negative sentiment polarity terms and phrases are included in both articles. In addition, as a part of the contextual mapping and relationship determination operations 530, a plurality of syntactic relationships are determined through the terms used in both articles. Therefore, updated scoring operations 534 of the newly established contextual relationships and the previous contextual relationships are executed such that the score of the second article will approach 100% indicating that there is great risk associated with establishing a business relationship with the subject business entity individual. In addition, the second article will be ranked 536 higher than the first article.

Referring again to FIGS. 4 and 5, the iterative process extending from the operation 530 and including the operations 524, 532, 534, and 536, also includes a determination operation 538. Specifically, a determination 538 is made as to whether the requirements for completion of the analyses in the aforementioned iterative process have been met. In some embodiments, the requirements for completion may include, without limitation, a total number of unstructured data documents 442 ingested. For example, if after a predetermined period of time, no unstructured data documents 442 are located, it is highly likely that the subject business entity has a low risk. Also, without limitation, a predetermined number of unstructured data documents 442 are located, where at least a portion of such unstructured data documents 442 have high scores and rankings, it is highly likely that the subject business entity has a high risk. Moreover, without limitation, if after a predetermined period of time, the scoring and ranking remains relatively static for a predetermined period of time or a predetermined number of iterations, the iterative process may be considered complete. If the output of the determination operation 538 is "No," the process 500 returns to the continue to analyze operation 530 of the iterative process. If the output of the determination operation 538 is "Yes," the process 500 ends 540.

The system, computer program product, and method as disclosed herein facilitate overcoming the disadvantages and limitations of known KYC and due diligence methods through leveraging structured data and unstructured data, and, more specifically, to ranking documentation from unstructured data sources through leveraging insights provided by the structured data to facilitate associated business risk inquiries. For example, the present disclosure describes using the relatively easy-to-find structured data, such as publicly-available financial information, and then use such data to search for the relatively more difficult-to-find, relevant unstructured data, e.g., published articles. The identification of the relevant portions of the structured data and the subsequent searching with various formulations of search terms based on such relevant structured data may be substantially automated. In addition, as unstructured data documents are located, the analysis, scoring, and ranking of the documents is substantially automated. Furthermore, the removal of extensive manual analyses and research followed by more manual analyses accelerates the KYC and due diligence processes by substantially automating the identification of the relevant unstructured documents, the examination of the documents, identification of relevant portions of the documents, elimination of non-relevant documents and portions of documents, scoring the relationships between the structured and unstructured documents, and scoring and ranking of the relevant documents as a function of the scored relationships. For example, the entire KYC/due diligence process may be executed in minutes rather than days. Further, the automated processes described herein facilitate more comprehensive searching for the unstructured data, especially those documents that may be otherwise overlooked by a manual search due to apparent obscurity. Specifically, the researching business entity is most concerned with "negative news" regarding the subject business entity being researched. The methods and systems described herein facilitate locating such "negative news" associated with the subject business entity, even if such information may be relatively difficult to locate due to obscure or merely tangential references to the subject business entity. Moreover, the automated analyses of the documents are less prone to human error, where the automated processes described herein provide a consistent basis for scoring and ranking the documents with respect to the risks that may be present. Accordingly, significant improvements to known KYC and due diligent processes are realized through the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more processing devices and at least one memory device operably coupled to the one or more processing devices via a communication bus, the computer system is configured to:
identify, by a structured data search sub-module embedded within a due diligence module executed by a due diligence engine included in the at least one memory device of the computer system, one or more structured data sources, wherein the one or more structured data sources include at least a portion of structured data, wherein the structured data is directed to one or more subject business entities;
extract, by the structured data search sub-module, the at least a portion of the structured data directed toward the one or more subject business entities;
transmit, by the structured data search sub-module, the at least a portion of the structured data to an unstructured data search sub-module of the due diligence module;
identify, by the unstructured data search sub-module using the at least a portion of the structured data, one or more unstructured data sources, wherein at least a portion of the one or more unstructured data sources are directed to the one or more subject business entities, wherein the at least a portion of the structured data includes information for locating the one or more unstructured data sources;
search, by the unstructured data search sub-module using the information for locating the one or more unstructured data sources, the one or more unstructured data sources to identify one or more documents from the one or more unstructured data sources that have information directed to the one or more subject business entities embedded therein, wherein the one or more documents directed to the one or more subject business entities identify unstructured data, wherein the unstructured data is directed to the one or more subject business entities;
determine, by a data integration sub-module of the due diligence module using a mapping of the at least a portion of the structured data and the identified unstructured data, one or more relationships between the at least a portion of the structured data and at least a portion of the unstructured data;
transmit, by the data integration sub-module, each relationship of the one or more relationships to an unstructured data scoring sub-module of the due diligence module;
score, by the unstructured data scoring sub-module, each relationship of the one or more relationships;
rank, by the unstructured data scoring sub-module, each document of the one or more documents from the one or more unstructured data sources directed to the one or more subject business entities as a function of the score of each relationship of the one or more relationships;
analyze the one or more documents from the one or more unstructured data sources directed to the one or more subject business entities using one or more natural language processing (NLP) processes; and
execute both of:
a sentiment analysis of at least a portion of the unstructured data within a plurality of documents of the unstructured data, thereby determine one or more sentimental associations between at least a portion of the plurality of documents of the unstructured data and at least a portion of the structured data; and
a co-referential analysis of at least a portion of metadata within the plurality of documents of the unstructured data and the at least a portion of structured data, thereby establish a syntactic relationship between a plurality of expressions in a least a portion of text of the unstructured data and the structured data; and
determine a risk of establishing a business relationship with the one or more subject business entities based on the rank of each document of the one or more documents, wherein the computer system is further configured to execute the scoring each relationship of the one or more relationships comprising:
re-evaluate, through a plurality of iterative scorings, the score of each document of the unstructured data comprising one or more of:
generate, by the data integration sub-module, a query for searching the one or more unstructured data source documents; and
search, by the unstructured data search sub-module using the query, the one or more unstructured data sources to identify one or more additional documents from the one or more unstructured data sources that have additional information directed to the one or more subject business entities embedded therein, wherein the one or more additional documents directed to the one or more subject business entities identify additional unstructured data, wherein the additional unstructured data is directed to the one or more subject business entities.

2. The system of claim 1, wherein the computer system is further configured to execute the scoring each relationship of the one or more relationships comprising:
execute an initial scoring of each document of the unstructured data as a function of a determination of each relationship of the one or more relationships.

3. The system of claim 1, wherein the computer system is further configured to:
capture names of principals, past and present, of the one or more subject business entities;
capture one or more of the principals' associations and roles within the one or more subject business entities;
capture a physical location of one or more business offices associated with the one or more subject business entities; and
capture at least a portion of published financial data associated with the one or more subject business entities.

4. The system of claim 1, wherein the computer system is further configured to:
map the at least a portion of the unstructured data to the at least a portion of the structured data.

5. A computer program product, comprising:
one or more computer readable storage media; and
program instructions collectively stored on the one or more computer storage media, the program instructions comprising:
program instructions to identify one or more structured data sources, by a structured data search sub-module embedded within a due diligence module executable by a due diligence engine included in at least one memory device operably coupled to one or more processing devices via a communication bus of a computer system, wherein the one or more structured data sources include at least a portion of structured data, wherein the structured data is directed to one or more subject business entities;
program instructions to extract, by the structured data search sub-module, the at least a portion of the structured data directed toward the one or more subject business entities;
program instructions to transmit, by the structured data search sub-module, the at least a portion of the structured data to an unstructured data search sub-module of the due diligence module;
program instructions to identify, by the unstructured data search sub-module using the at least a portion of the structured data, one or more unstructured data sources, wherein at least a portion of the one or more unstructured data sources are directed to the one or more subject business entities, wherein the at least a portion of the structured data includes information for locating the one or more unstructured data sources;
program instructions to search, by the unstructured data search sub-module using the information for locating the one or more unstructured data sources, the one or more unstructured data sources to identify one or more documents from the one or more unstructured data sources that have information directed to the one or more subject business entities embedded therein, wherein the one or more documents directed to the one or more subject business identify unstructured data, wherein the unstructured data is directed to the one or more subject business entities;
program instructions to determine, by a data integration sub-module of the due diligence module using a mapping of the at least a portion of the structured data and the identified unstructured data, one or more relationships between the at least a portion of the structured data and at least a portion of the unstructured data;
program instructions to transmit, by the data integration sub-module, each relationship of the one or more relationships to an unstructured data scoring sub-module of the due diligence module;
program instructions to score, by the unstructured data scoring sub-module, each relationship of the one or more relationships;
program instructions to rank, by the unstructured data scoring sub-module, each document of the one or more documents from the one or more unstructured data sources directed to the one or more subject business entities as a function of the score of each relationship of the one or more relationships;
program instructions to analyze the one or more documents from the one or more unstructured data sources directed to the one or more subject business entities through one or more natural language processing (NLP) processes; and
program instructions to execute both of:
a sentiment analysis of at least a portion of the unstructured data within a plurality of documents of the unstructured data, thereby determine one or more sentimental associations between at least a portion of the plurality of documents of the unstructured data and at least a portion of the structured data; and
a co-referential analysis of at least a portion of metadata within the plurality of documents of the unstructured data and the at least a portion of structured data, thereby establish a syntactic relationship between a plurality of expressions in a least a portion of text of the unstructured data and the structured data;
program instructions to determine a risk of establishing a business relationship with the one or more subject business entities based on the rank of each document of the one or more documents; and
program instructions to re-evaluate, through plurality of iterative scorings, the score of each document of the unstructured data comprising:
program instructions to generate, by the data integration sub-module, a query for searching the one or more unstructured data source documents; and
program instructions to search, by the unstructured data search sub-module using the query, the one or more unstructured data sources to identify one or more additional documents from the one or more unstructured data sources that have additional information directed to the one or more subject business entities embedded therein, wherein the one or more additional documents directed to the one or more subject business entities identify additional unstructured data, wherein the additional unstructured data is directed to the one or more subject business entities.

6. The computer program product of claim 5, further comprising:
program instructions to execute the scoring each relationship of the one or more relationships comprising:
program instructions to execute an initial scoring of each document of the unstructured data as a function of a determination of each relationship of the one or more relationships.

7. A computer-implemented method comprising:
identifying, by a structured data search sub-module embedded within a due diligence module executed by a due diligence engine included in at least one memory device operably coupled to one or more processing devices via a communication bus of a computer system, one or more structured data sources, wherein the one or more structured data sources include at least a portion of structured data, wherein the structured data is directed to one or more subject business entities;
extracting, by the structured data search sub-module, the at least a portion of the structured data directed toward the one or more subject business entities;
transmitting, by the structured data search sub-module, the at least a portion of the structured data to an unstructured data search sub-module of the due diligence module;
identifying, by the unstructured data search sub-module using the at least a portion of the structured data, one or more unstructured data sources, wherein at least a portion of the one or more unstructured data sources are directed to the one or more subject business entities, wherein the at least a portion of the structured data includes information for locating the one or more unstructured data sources;
searching, by the unstructured data search sub-module using the information for locating the one or more unstructured data sources, the one or more unstructured data sources to identify one or more documents from the one or more unstructured data sources that have information directed to the one or more subject business entities embedded therein, wherein the one or more documents directed to the one or more subject business entities identifying unstructured data, wherein the unstructured data is directed to the one or more subject business entities;
determining, by a data integration sub-module of the due diligence module using a mapping of the at least a portion of the structured data and the identified unstructured data, one or more relationships between the at least a portion of the structured data and at least a portion of the unstructured data;
transmitting, by the data integration sub-module, each relationship of the one or more relationships to an unstructured data scoring sub-module of the due diligence module;
scoring, by the unstructured data scoring sub-module, each relationship of the one or more relationships; and
ranking, by the unstructured data scoring sub-module, each document of the one or more documents from the one or more unstructured data sources directed to the one or more subject business entities as a function of the scoring of each relationship of the one or more relationships, wherein the scoring each relationship of the one or more relationships comprises:
analyzing the one or more documents from the one or more unstructured data sources directed to the one or more subject business entities through one or more natural language processing (NLP) processes; and
executing both of:
a sentiment analysis of at least a portion of the unstructured data within a plurality of documents of the unstructured data, thereby determine one or more sentimental associations between at least a portion of the plurality of documents of the unstructured data and at least a portion of the structured data; and
a co-referential analysis of at least a portion of metadata within the plurality of documents of the unstructured data and the at least a portion of structured data, thereby establishing a syntactic relationship between a plurality of expressions in a least a portion of text of the unstructured data and the structured data, wherein the executing the one or more of the sentiment analysis and the co-referential analysis comprises:
determining a risk of establishing a business relationship with the one or more subject business entities based on the rank of each document of the one or more documents, wherein the scoring each relationship of the one or more relationships comprises:
re-evaluating, through a plurality of iterative scorings, the score of each document of the unstructured data comprising:
generate, by the data integration sub-module, a query for searching the one or more unstructured data source documents; and
search, by the unstructured data search sub-module using the query, the one or more unstructured data sources to identify one or more additional documents from the one or more unstructured data sources that have additional information directed to the one or more subject business entities embedded therein, wherein the one or more additional documents directed to the one or more subject business entities identify additional unstructured data, wherein the additional unstructured data is directed to the one or more subject business entities.

8. The method of claim 7, wherein the scoring each relationship of the one or more relationships comprises:
executing an initial scoring of each document of the unstructured data as a function of a determination of each relationship of the one or more relationships.

9. The method of claim 7, wherein the extracting the at least a portion of the structured data directed toward the one or more subject business entities comprises:
capturing names of principals, past and present, of the one or more subject business entities;
capturing one or more of the principals' associations and roles within the one or more subject business entities;
capturing a physical location of one or more business offices associated with the one or more subject business entities; and
capturing at least a portion of published financial data associated with the one or more subject business entities.

10. The method of claim 7, wherein the determining, through the at least a portion of the structured data, one or more relationships with at least a portion of the unstructured data comprises:
mapping the at least a portion of the unstructured data to the at least a portion of the structured data.

11. The system of claim 1, wherein the computer system is further configured to:

search the one or more structured data sources based on the one or more subject business entities.

12. The computer program product of claim 5, further comprising:
programming instructions to search the one or more structured data sources based on the one or more subject business entities.

13. The method of claim 7, further comprising:
searching the one or more structured data sources based on the one or more subject business entities.

14. The system of claim 1, wherein the computer system is further configured to:
adjust the score of each document of the unstructured data upward for a negative sentiment polarity; and
adjust the score of each document of the unstructured data downward for a positive sentiment polarity.

15. The computer program product of claim 5, further comprising:
program instructions to adjust the score of each document of the unstructured data upward for a negative sentiment polarity; and
program instructions to adjust the score of each document of the unstructured data downward for a positive sentiment polarity.

16. The method of claim 7, further comprising:
adjusting the score of each document of the unstructured data upward for a negative sentiment polarity; and
adjusting the score of each document of the unstructured data downward for a positive sentiment polarity.

\* \* \* \* \*